(12) United States Patent
Gu

(10) Patent No.: US 6,895,090 B1
(45) Date of Patent: May 17, 2005

(54) PSEUDO-NOISE SEQUENCE WITH INSERTION HAVING VARIANT LENGTH AND POSITION

(75) Inventor: Zhengou Gu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/302,608

(22) Filed: Apr. 30, 1999

(51) Int. Cl.$^7$ ................................................ H04L 9/00
(52) U.S. Cl. ........................... 380/46; 380/47; 380/264; 380/265
(58) Field of Search ........................... 380/46, 47, 264, 380/265

(56) References Cited

U.S. PATENT DOCUMENTS

| | | | |
|---|---|---|---|
| 4,776,012 A | * | 10/1988 | Zscheile et al. ............. 375/134 |
| 4,809,295 A | | 2/1989 | Zscheile, Jr. et al. |
| 4,866,735 A | | 9/1989 | Mori et al. |
| 4,873,699 A | | 10/1989 | Saussier et al. |
| 4,944,009 A | * | 7/1990 | Micali et al. ................. 380/46 |
| 5,228,054 A | | 7/1993 | Rueth et al. ................... 375/1 |
| 5,878,075 A | | 3/1999 | Frank et al. |

FOREIGN PATENT DOCUMENTS

| | | |
|---|---|---|
| EP | 0 345 845 A2 | 12/1989 |
| EP | 0 782 069 A1 | 7/1997 |

OTHER PUBLICATIONS

Bruce Schneier, Applied Cryptography, Copyright 1996, John Wiley & Sons, Inc., pp. 421–424.*

* cited by examiner

Primary Examiner—Gilberto Barrón Jr.
Assistant Examiner—Benjamin E Lanier
(74) Attorney, Agent, or Firm—Frederick J. Telecky, Jr.; W. James Brady, III

(57) ABSTRACT

An augmented pseudo-noise sequence (10) is generated from a two or more pseudo-noise sequences, using LFSRs or other such devices. A segment (16) of a one pseudo-noise sequence (14), having an arbitrary length, is inserted into another pseudo-noise sequence (12) at an arbitrary position, making the augmented sequence difficult to decipher by a third party. Additional segments of arbitrary length can also be inserted at arbitrary positions for further complexity.

17 Claims, 3 Drawing Sheets

PSEUDO-NOISE SEQUENCE WITH INSERTION HAVING VARIANT LENGTH AND POSITION

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to spread spectrum communications and data encryption.

2. Description of the Related Art

Spread spectrum communication devices have been used in military and commercial devices for many years. These devices use noise-like waves to spread (cover) the information bits so that transmission bandwidth is much wider than that required for simple point-to-point communication. DS-CDMA (Direct Spreading Code Division Multiple Access) is a form of spread spectrum which uses a conventional communication waveform and a pseudo-noise (PN) sequence to transmit information. The PN sequence is commonly generated using a Linear Feedback Shift Register (LFSR).

In addition to its improved capacity and quality, spread spectrum techniques provide secure communications, since the receiver will generate the same PN sequence as the transmitter. While normal spread spectrum devices are very secure relative to other communication devices, it is possible to determine the polynomial being used to generate the pseudo-noise sequence, since there are a finite number of polynomials for a given sequence length. While third-party deciphering the pseudo-noise sequence may require significant computing power, it is possible that such resources may be available to decipher highly confidential communications.

Accordingly, a need has arisen for a method and apparatus for generating a PN sequence which is difficult to decipher.

BRIEF SUMMARY OF THE INVENTION

In the present invention, a communication signal is encrypted using an augmented pseudo-noise sequence. The augmented pseudo-noise sequence is created by generating a plurality of pseudo-noise sequences and combining these pseudo-noise sequences, or portions thereof. The data signal is encrypted using the augmented pseudo-noise sequence.

The present invention provides significant improvements over the prior art. Insertion of one or more segments of arbitrary length from other PN sequences in real time at respective arbitrary points in a PN sequence creates a PN sequence which is almost impossible to decipher. For each period of the augmented PN sequence, the segment parameters and insertion points may change, further increasing the complexity in decrypting the PN sequence.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–5 of the drawings, like numerals being used for like elements of the various drawings.

Figure 1:
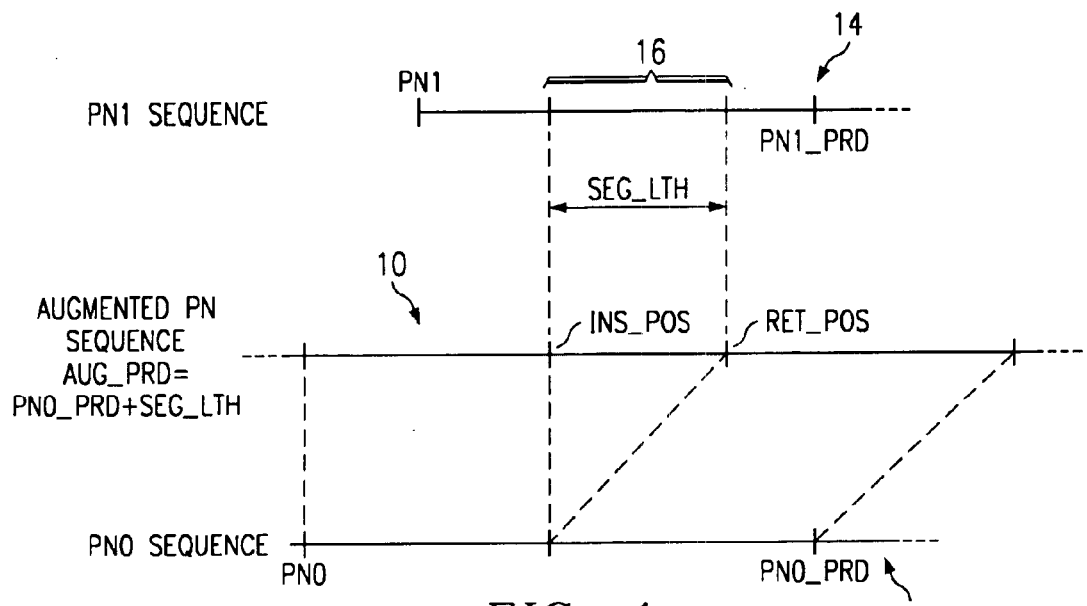
FIG. 1 illustrates a general overview of an augmented PN sequence.

FIG. 1 illustrates a general overview of an augmented PN sequence 10 for use in spread spectrum devices, or any other device using a PN sequence, formed from two or more PN sequences, PN0 sequence 12 and PN1 sequence 14. The augmented PN sequence 10, PN0 sequence 12 and PN1 sequence 14 could be streams of real or complex numbers, depending upon the application. For example, in a QPSK DS-CDMA system, the augmented PN sequence 10, PN0 sequence 12, and PN1 sequence 14 would be sequences of complex numbers, $PN(k)=PN(k)_I+jPN(k)_Q$, where $PN(k)_I$ and $PN(k)_Q$ are one bit values. Many other systems use sequences of real numbers.

A segment 16 of the PN1 sequence 14, which may be all or part of the PN1 sequence, is inserted into the PN0 sequence 12 at an arbitrary position INS_POS of the augmented PN sequence. Segment 16 has arbitrary length SEG_LTH.

In operation, the augmented PN sequence 10 can be used by a data scrambling device in place of the normal, unaugmented PN sequence. Because the augmented PN sequence includes insertion of a second sequence of arbitrary length at an arbitrary position in the augmented PN sequence, determining the polynomial would be exceeding difficult, even using supercomputers.

It should be noted that while the embodiment of FIG. 1 illustrates an augmented PN sequence wherein a single segment 16 is inserted into another PN sequence, multiple segments from multiple PN sequences could be inserted into the pseudo-noise sequence, making it even more difficult to decrypt. Further, the starting and ending points of the segment(s) and the insertion point(s) can be modified as often as every period of the augmented PN sequence to further increase complexity.

Figure 2:
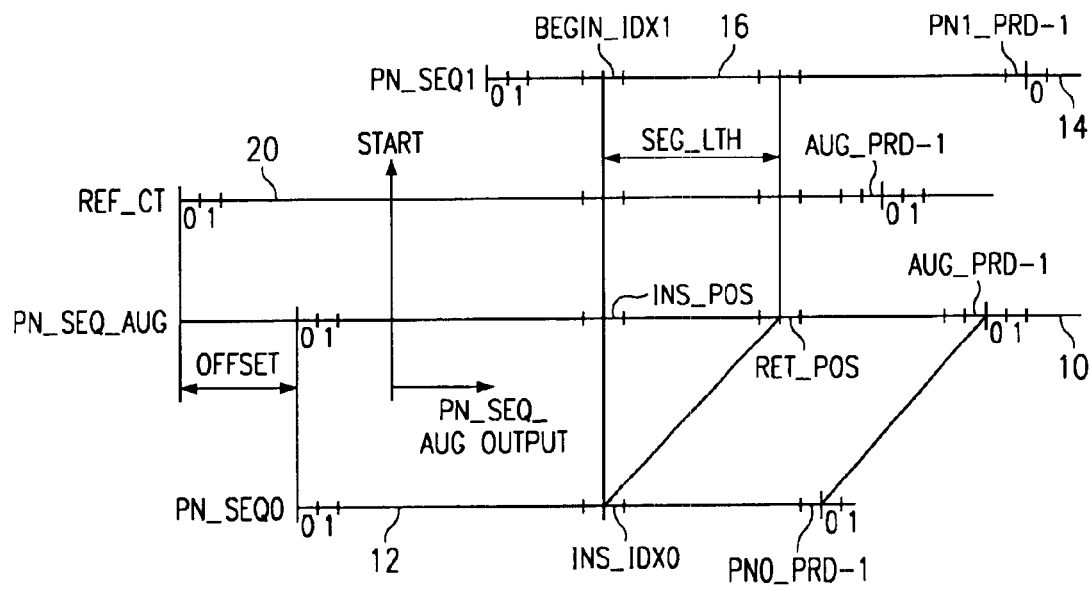
FIG. 2 illustrates a preferred embodiment of an augmented sequence which allows for an offset and describes the formation of the augmented sequence.

FIG. 2 illustrates a preferred embodiment which allows for an offset and describes the formation of the augmented sequence in greater detail. The offset allows greater flexibility for synchronization within the system. FIG. 2 illustrates the Augmented PN sequence 10, PN0 sequence 12, PN1 sequence 14, relative to a reference clock (REF_CT) 20. The reference clock 20 has the same period (AUG_PRD) as the augmented PN sequence 10. OFFSET defines the shift between the starting point (the first word, where a "word" could be a one bit value for a PN sequence of real values or a two bit value for a PN sequence of complex values) of the augmented PN sequence 10 and the start of the reference clock 20. PN0 sequence 12 has a period of PN0_PRD and PN1 sequence 14 has a period of PN1_PRD. One period of the augmented PN sequence 10 is formed from a first segment of PN0 sequence 12 defined by words 0 through INS_DX0–1 of the PN0 sequence 12, followed by a segment of from PN1 sequence (defined by a segment of SEG_LTH words starting at position BEGIN_IDX1 of the PN1 sequence 14), followed by a second segment of PN0 sequence 12 defined by words from position INS_IDX0 to PN0_PRD-1 of the PN0 sequence 12 (i.e., the remaining words of the PN0 sequence 12). Relative to the augmented PN sequence 10, the inserted segment is located in the sequence starting at position INS_POS and ending on RET_POS-1.

The output of the augmented PN sequence 10 can begin at any position in the augmented PN sequence 10. In the illustrated embodiment, the output of the augmented PN sequence 10 starts at the position labeled START.

Figure 3:
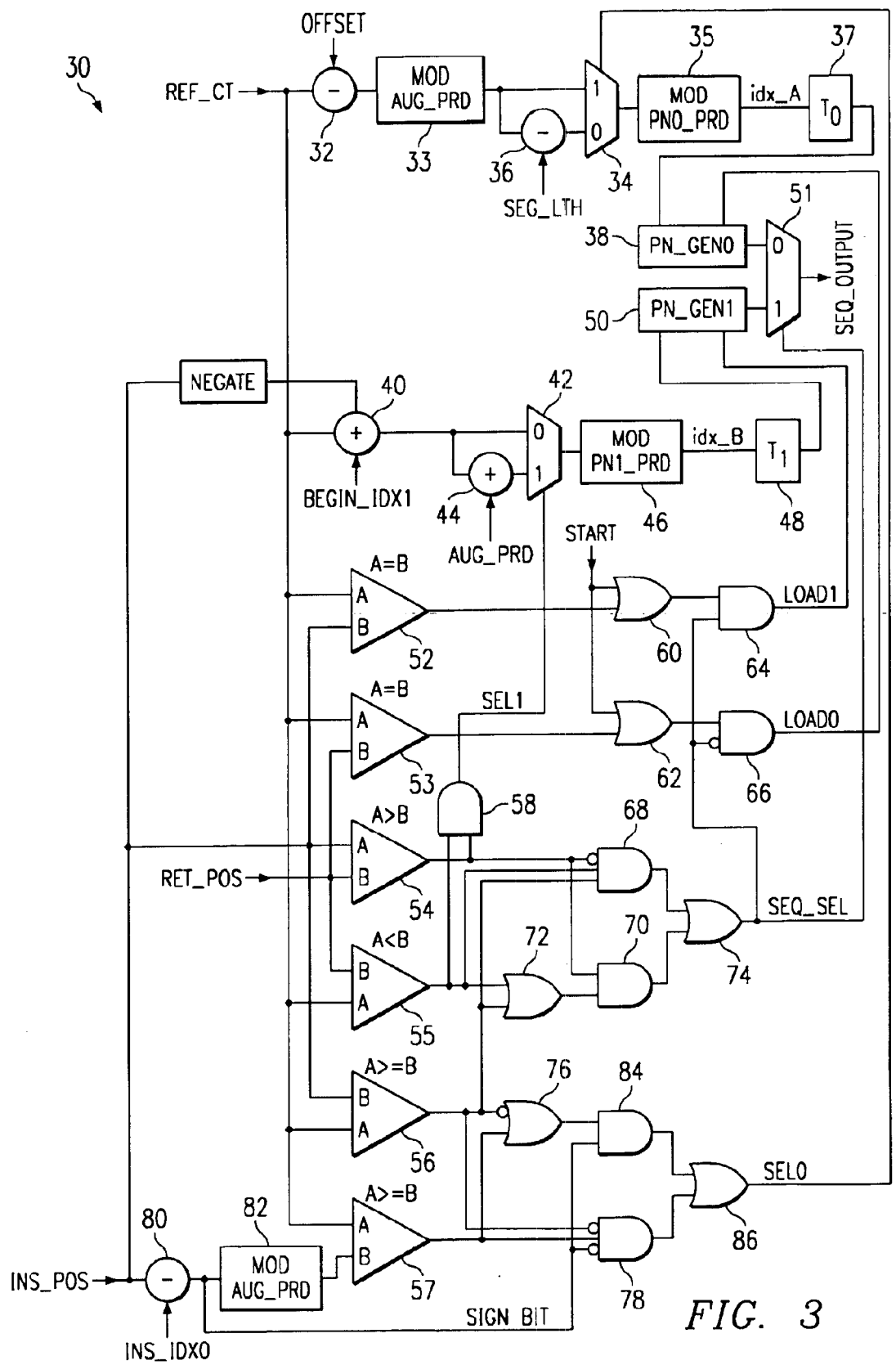
FIG. 3 illustrates a schematic representation of a circuit for generating the augmented sequence of FIG. 2.

FIG. 3 illustrates a schematic representation of a circuit 30 which performs the function described hereinabove. The reference dock signal (REF_CT) is input to one input of a subtractor circuit 32 along with the OFFSET signal. The output of the subtractor circuit 32 is input to a modulo circuit 33 which calculates the remainder of a division of the output of subtractor circuit 32 by AUG_PRD. This remainder is coupled to the first input of dual port multiplexer 34 and to a first input to subtractor 36. The second input to subtractor 36 is the segment length (SEG_LTH), which is a constant during a given period of the augmented PN sequence (although it can change in subsequent periods). The output of subtractor 36 is coupled to the second input to multiplexer 34. The output of multiplexer 34 coupled to a modulo circuit 35 (generating the remainder resulting from a division of the output of the multiplexer 34 with PN0_PRD) which calculates idx_A, which specifies a current index in the PN0 sequence. This index is coupled to the transition matrix 37 which is used by the PN0 pseudo-noise sequence generator 38 (typically a LFSR or similar circuit) to generate the PN0 sequence. An embodiment for the LFSR and transition matrix are discussed in greater detail in U.S. Ser. No. 09/222,454, entitled "State Calculation Circuit for Discrete Linear State Space Model" to Gu, assigned to TEXAS INSTRUMENTS INCORPORATED of Dallas, Tex., filed Dec. 29, 1998, which is incorporated by reference herein.

REF_CT is also coupled adder 40 along with the two's complement of INS_POS and BEGIN_IDX1 (see FIG. 2) to adder 40, which sums the three inputs. The output of adder 40 is coupled to a first input of multiplexer 42 and to an input of adder 44. The second input of adder 42 is coupled to AUG_PRD (see FIG. 2). The output of adder 44 is coupled to a second input of multiplexer 42. The output of multiplexer 42 is coupled to modulo circuit 46 (generating the remainder resulting from a division of the output of the multiplexer 42 with PN1_PRD). The output of modulo circuit 46 is idx_B, which specifies a current position in the PN1 sequence. This index is coupled to transition matrix 48 which is used by the PN1 pseudo-noise sequence generator 50 to generate the PN1 sequence. The outputs of PN sequence generators 38 and 50 are coupled to inputs of dual port multiplexer 51. The multiplexer 51 selects between the two PN sequences to generate the augmented PN sequence.

A bank of comparators 52–57 perform various comparisons used to control multiplexers 34 and 42, PN sequence generators 38 and 50 and multiplexer 51. Comparator 52 determines whether REF_CT is equal to INS_POS. Comparator 53 determines whether REF_CT is equal to RET_POS. Comparator 54 determines whether INS_POS is greater than RET_POS. Comparator 55 determines whether RET_POS is greater than REF_CT. Comparator 56 determines whether REF_CT is greater or equal to INS_POS. Comparator 57 determines whether REF_CT is greater or equal to (INS_POS-INS_IDX0) mod AUG_PRD. The outputs of comparators 54 and 55 are input to AND gate 58 to control multiplexer 42.

START is coupled first input gates in OR gates 60 and 62. The output of comparator 52 is coupled to the second input of OR gate 60 and the output of comparator 53 is coupled to the second input of OR gate 62. The output of OR gate 60 is coupled to a first input of AND gate 64 and the output of OR gate 62 is coupled to a first input of AND gate 66. The output of AND gate 64 is coupled to a control port on PN1 sequence generator 50 and the output of AND gate 66 is coupled to a control port on PN0 sequence generator 38. The control ports on sequence generators 38 and 50 load the correct PN states from transition matrices 37 and 48, respectively, and thus reset the sequence generators to a predetermined point in the respective sequence for each period of the augmented PN sequence.

The output of comparator 54 is also coupled to an inverted input of AND gate 68 and to a non-inverted input of AND gate 70. The output of comparator 55 is coupled to an input of AND gate 68 and to an input of OR gate 72. The output of comparator 56 is coupled to an input of AND gate 68 and to an input of OR gate 72. The output of OR gate 72 is coupled to an input of AND gate 70. The outputs of AND gates 68 and 70 are coupled to inputs of OR gate 74. The output of OR gate 74 is the SEQ_SEL signal which controls multiplexer 51 to select which sequence, PN0 or PN1, is output as the augmented PN sequence. The output of OR gate 74 is also coupled to the inputs of And gates 64 and 66 to make sure that only one of the two PN generators is selected at a given time.

The output of comparator 56 is also output to OR gate 76 through an inverted input and to AND gate 78 through an inverted input. The output of comparator 57 is coupled to a non-inverted input of OR gate 76 and to a non-inverted input of AND gate 78. Subtractor 80 receives INS_POS and INS_IDX0 (see FIG. 2) and outputs the difference (INS_POS-INS_IDX0) to modulo circuit 82, which calculates (INS_POS-INS_IDX0) mod AUG_PRD. The output of modulo circuit 82 is coupled to the "B" input of comparator 57 and the sign bit of the difference calculation of subtractor 80 is coupled to an inverted input of AND gate 78 and to a non-inverted input of AND gate 84. The output of OR gate 76 is also coupled to an input of AND gate 84. The outputs of AND gates 78 and 84 are coupled to the inputs of OR gate 86. The output of OR gate 86 is the SEL0 signal which controls multiplexer 34.

In operation, the circuit works as follows. The SEQ_SEL signal output from OR gate 74 switches between the outputs of the PN0 sequence generator 38 and the PN1 sequence generator 50. The PN0 sequence is effectively paused while the PN1 segment is inserted into the augmented PN sequence. Switching between the PN0 and PN1 sequences can be accomplished either by pausing the generation of the PN0 or PN1 sequence when it is not selected by multiplexer 51 or by loading the sequence generators at appropriate times to start the sequence at a predetermined point. At steady state, the LOAD0 output from AND gate 66 starts the PN0 sequence at INS_IDX0 after the PN1 segment is complete. The LOAD1 output from AND gate 64 starts the PN1 segment at the BEGIN_IDX1 position when the augmented PN sequence has reached INS_POS.

At the initial time, the START signal together with the other control signals decide the first bit of the augmented PN sequence 10 for output, since the output can begin at any position within the PN0 sequence 12 or segment 16. The SEL0 signal (the output of OR gate 86) and the SEL1 signal (the output of AND gate 58), control the multiplexers 34 and 42 to select the correct PN index for T0 and T1, respectively, based on all of the input parameters. The SEL0 signal provides for subtraction of SEG_LTH from the output of the modulo circuit 33 after insertion of segment 16. The SEL1 signal accommodates the situation where the segment 16 spans the first bit of the augmented PN sequence 10, i.e., where INS_POS precedes the first bit of the augmented PN sequence 10 and the RET_POS is after the first bit of the augmented PN sequence 10.

Figure 4:
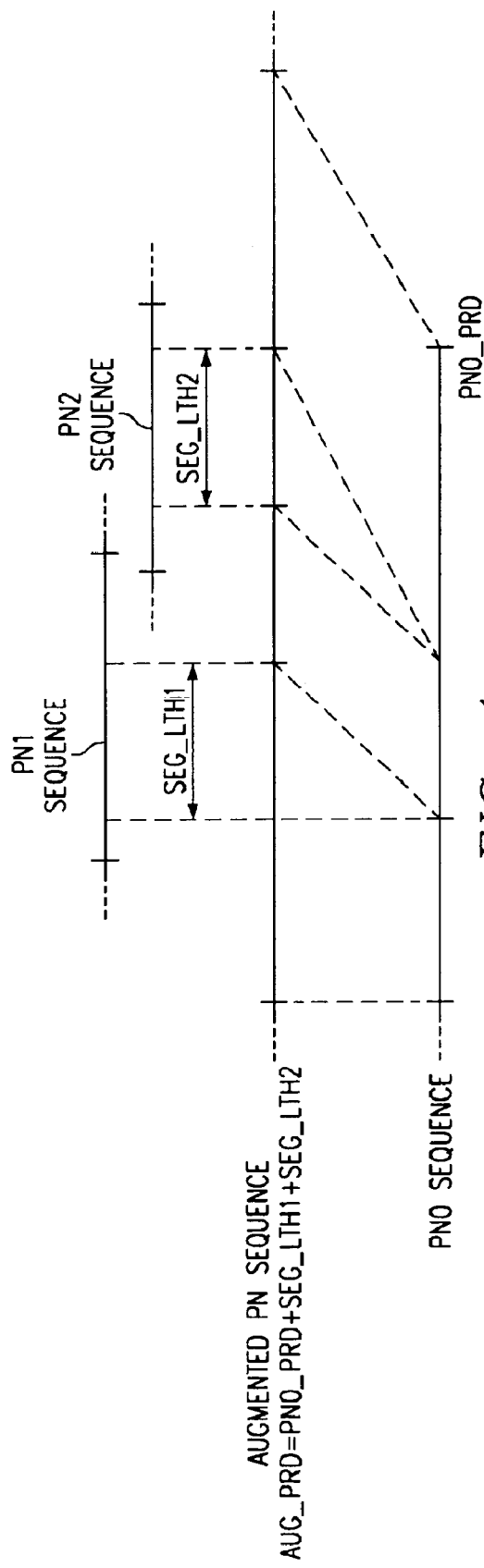
FIG. 4 illustrates a schematic representation of an augmented sequence using multiple segments.

FIG. 4 illustrates a timing diagram where the PN0 sequence is augmented by segments from PN1 and PN2. In this case, the segment from PN1 is inserted at INS_POS1 and the segment from PN2 is inserted at INS_POS2. Any number of PN sequences could be used to generate the augmented PN sequence. Further, the segments could be inserted into other segments; for example, the PN2 sequence segment could be inserted into the PN1 segment.

Figure 5:
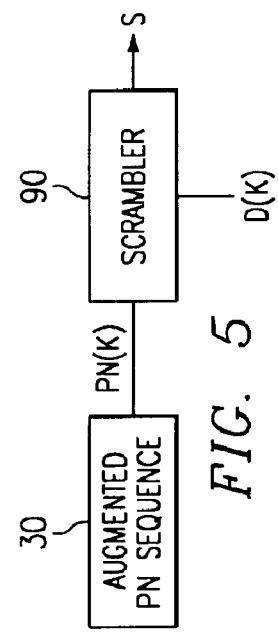
FIG. 5 illustrates use of the augmented pseudo-noise sequence to encode a data signal.

FIG. 5 illustrates a block diagram showing the use of the augmented PN sequence to encrypt a data stream. The pseudo-noise sequence generator 30 outputs a sequence of pseudo-noise words PN(k) to scrambler 90 along with data stream D(k). Data stream D(k) could be any digital data stream which would benefit from scrambling techniques, such as a digital communication signal or a native digital signal such as the output of a computing device. In the preferred embodiment, the scrambler circuit 90 performs an exclusive-or operation on the digital data stream D(k) and the pseudo-noise sequence PN(k) to generate the output S.

The present invention provides significant improvements over the prior art. Insertion of a one or more segments of arbitrary length at respective arbitrary points in a PN sequence creates a PN sequence which is almost impossible to decipher.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of encrypting a digital signal comprising:
   generating a plurality of pseudo-noise sequences;
   inserting a segment of a first pseudo-noise sequence into a second pseudo-noise sequence, or portion thereof, at an arbitrary position in said second pseudo-noise sequence to generate an augmented pseudo-noise sequence; and
   encrypting a data stream using the augmented pseudo-noise sequence.

2. The method of claim 1 wherein said generating step comprises the step of generating two pseudo-noise sequences.

3. The method of claim 1 wherein said generating step comprises the step of generating three or more pseudo-noise sequences.

4. The method of claim 1 wherein said segment has an arbitrary length.

5. The method of claim 1 wherein said segment has arbitrary starting and ending positions within said first pseudo-noise sequence.

6. The method of claim 1 and further comprising the step of starting the output of the augmented pseudo-noise sequence at an arbitrary position in the sequence.

7. The method of claim 1 and further comprising the step of synchronizing the augmented pseudo-noise sequence to a reference clock.

8. Apparatus for encrypting a digital signal comprising:
   two or more pseudo-noise sequence generators;
   circuitry for inserting a segment of a first pseudo-noise sequence into a second pseudo-noise sequence, or portion thereof, at an arbitrary position in said second pseudo-noise sequence to generate an augmented pseudo-noise sequence; and
   an encrypting circuit for correlating the augmented pseudo-noise sequence with a data stream.

9. The apparatus of claim 8 wherein said two or more pseudo-noise sequence generators comprises three or more pseudo-noise sequence generators.

10. The apparatus of claim 8 wherein said segment has an arbitrary length.

11. The apparatus of claim 8 wherein said segment has arbitrary starting and ending positions within said first pseudo-noise sequence.

12. The apparatus of claim 8 wherein said encrypting circuit performs an exclusive-or operation.

13. The apparatus of claim 8 and further comprising circuitry for stating the output of the augmented pseudo-noise sequence at an arbitrary position in the sequence.

14. The apparatus of claim 8 and further comprising circuitry for synchronizing the augmented pseudo-noise sequence to a reference clock.

15. A method of encrypting a digital signal comprising:
   generating a plurality of pseudo-noise sequences;
   concatenating said pseudo-noise sequences, or portions thereof, to generate an augmented pseudo-noise sequence;
   synchronizing the augmented pseudo-noise sequence to a reference clock relative to an arbitrary offset; and
   encrypting a data stream using the augmented pseudo-noise sequence.

16. Apparatus for encrypting a digital signal comprising:
   two or more pseudo-noise sequence generators;
   circuitry for concatenating said pseudo-noise sequences, or portions thereof, to generate an augmented pseudo-noise sequence;
   circuitry for starting the output of the augmented pseudo-noise sequence at an arbitrary position in the sequence; and
   an encrypting circuit for correlating the augmented pseudo-noise sequence with a data steam.

17. Apparatus for encrypting a digital signal comprising:
   two or more pseudo-noise sequence generators;
   circuitry for concatenating said pseudo-noise sequences, or portions thereof, to generate an augmented pseudo-noise sequence;
   circuitry for synchronizing the augmented pseudo-noise sequence to a reference clock relative to an arbitrary offset; and
   an encrypting circuit for correlating the augmented pseudo-noise sequence with a data stream.

* * * * *